(12) United States Patent
Karkare et al.

(10) Patent No.: US 7,266,810 B2
(45) Date of Patent: Sep. 4, 2007

(54) RUNTIME PROFILING OF PLATFORM-INDEPENDENT SOFTWARE APPLICATIONS

(75) Inventors: Ashish Karkare, San Jose, CA (US); Ryan Mathus, Fremont, CA (US); Alex Tsariounov, Fort Collins, CO (US); Amir Afghani, Santa Clara, CA (US)

(73) Assignee: Hewlett-Packard Development Company, LP., Houston, TX (US)

( * ) Notice: Subject to any disclaimer, the term of this patent is extended or adjusted under 35 U.S.C. 154(b) by 911 days.

(21) Appl. No.: 10/120,036

(22) Filed: Apr. 9, 2002

(65) Prior Publication Data
US 2003/0192036 A1 Oct. 9, 2003

(51) Int. Cl.
*G06F 9/44* (2006.01)
(52) U.S. Cl. ...................................... 717/130; 717/118
(58) Field of Classification Search ........ 717/168–178, 717/130, 118; 709/249
See application file for complete search history.

(56) References Cited

U.S. PATENT DOCUMENTS

| | | | | |
|---|---|---|---|---|
| 6,233,678 | B1 * | 5/2001 | Bala | 712/240 |
| 6,694,375 | B1 * | 2/2004 | Beddus et al. | 709/249 |
| 6,728,949 | B1 * | 4/2004 | Bryant et al. | 717/127 |
| 6,728,955 | B1 * | 4/2004 | Berry et al. | 717/158 |
| 6,757,720 | B1 * | 6/2004 | Weschler, Jr. | 709/220 |
| 6,829,760 | B1 * | 12/2004 | Bera | 717/142 |
| 2003/0018959 | A1 * | 1/2003 | Wallman et al. | 717/148 |

\* cited by examiner

*Primary Examiner*—Tuan Dam
*Assistant Examiner*—Issac T. Tecklu

(57) ABSTRACT

A system and method for profiling the runtime environment of a software application written in a platform-independent (e.g. platform neutral) programming language. Such a software application can invoke a non-application-code component to facilitate the functioning of the software application. The profiling tool and method can generate runtime profiles relating to both the software application and the non-application-code component invoked by the software application.

53 Claims, 12 Drawing Sheets

Prior Art Profiler

Message Protocol:

```
#define CONTINUATION        0xff
#define COMPILER            0x10
#define COMPILER_DELETE     0x00
#define COMPILER_INSERT     0x01
#define INTERPRETER         0x20
#define INTERPRETER_INSERT  0x02
``` prospect:java:<bit-field><bit-field><addr1><addr2><name>[<class>:<method>:<type>]
                         |--------binary blob--------| i.e.:
prospect:java:<0x10><0x01><0x6dc0d120><0x6dc0d4d8>
sun.awt.X11GraphicsEnvironment:getFontField:(Ljava/lang/String;I)Ljava/lang/String;

or prospect:java:<0x10><0x01><0x6dc04b20><0x6dc04ce4>safepoint_stub or prospect:java:<0x20><0x02><0x7c6d0><0x906d0>INTERPRETER

Figure 12

RUNTIME PROFILING OF PLATFORM-INDEPENDENT SOFTWARE APPLICATIONS

TECHNICAL FIELD

The present invention relates in general to the profiling of runtime environments. More specifically, the present invention relates to a system and method for the runtime profiling of a software application and the platform-dependent code component(s) used by the software application.

BACKGROUND OF THE INVENTION

Software development projects are increasingly including a "portability" requirement mandating that the software application function without modification in a variety of different platform environments (e.g. are "platform neutral" or "platform independent"). Some programming languages such as Java and C# were designed to foster platform-independence and thus are "platform neutral." Java uses an interface known as the "Java virtual machine" between the software application and the underlying technical architecture and operating environment (collectively "platform") in order to render the platform transparent to the software application. Platform neutral application code components (referred to as "bytecode" in Java applications) leave all platform-dependent processing, information, and cognizance for the virtual machine. A "platform-independent" software application can be distributed across multiple platforms without modification of the software application.

"Platform independent" software applications need not be limited to Java, C#, or some other programming language that is specifically designated to be "platform neutral." While other types and categories of programming languages may not have been specifically designed to create "platform neutral" software applications, a wide variety of different programming languages can utilize the Java virtual machine, a different non-Java virtual machine, or some other extra interface layer (collectively "virtual machine interface") in order to support "platform-independence" in those particular programming languages. The use of a virtual machine interface can transform many different computer programming languages into "platform-independent" programming languages.

Regardless of the specific characteristics of the virtual machine interface, the flexibility of platform-independent software applications raises challenges with respect to the ability to profile the runtime environments of those software applications. A virtual machine interface typically incorporates computer code written in a variety of different languages, which means that the software application using the virtual machine architecture typically interacts with and utilizes at least one or more computer code components that are written in programming languages different from the programming language of the software application. In a virtual machine or platform-independent application architecture, the execution of a software application requires the use of an extra-layer of computer code residing in the virtual machine interface. It is this extra layer of computer code, with the extra set of code component interactions, that makes profiling difficult.

The profiling of runtime environments is a prudent and often necessary step in the software development process as well as with regards to the management of existing information systems. For example, software applications that function adequately with only a few users and merely hundreds of rows of data in a testing environment may not function adequately when thousands of users are invoking the application to interact with millions of rows of data on a database. The profiling of the runtime environment of a software application is useful in determining whether that particular software application is scalable to the point where the application can adequately perform in a production environment. Profiling may be particularly important in situations involving "platform neutral" software and architectures because the existence of an additional interface layer such as a virtual machine, results in more interactions between various components of the system because such systems typically utilize a more compartmentalized infrastructure.

Prior art profiling tools and techniques for platform-independent runtime environments are inadequate. The existing art does not provide a way to profile both the software application and the non-application code components used by the software application in an unobtrusive and dynamic manner. The attributes of an interface such as a virtual machine that provides for platform transparency also interfere with the existing techniques and tools for comprehensive profiling of the runtime environment. Some existing art has attempted to use embedded agents and other forms of intrusive specialized application processing to enhance profiling capabilities, but such intrusive measures alter the runtime environment being profiled, often negating much of the information derived from the embedded profiling agent. It would be desirable to be able to comprehensively profile a runtime environment in a non-intrusive manner.

SUMMARY OF THE INVENTION

The present invention provides a profiling system for runtime environments that include a software application written in a platform-independent programming language, a non-application-code component invoked by the software application and a profiling tool for generating a runtime metric. The runtime metric includes an application metric and a non-application-code metric. The profiling tool generates the application metric from the software application and the non-application-code metric from the non-application-code component.

The present invention also provides a method for profiling the runtime environment of an application-code component by executing the application-code component in a runtime environment that includes a non-application code component, running a profiler with respect to the executing application-code component, generating an application-code metric from the application-code component with the profiler, and creating a non-application-code metric from the non-application-code component with the profiler. The application-code metric and the non-application-code metric are preferably generated from one execution of the application-code component in a runtime environment.

The present invention also provides a profiling tool stored on a medium for storing computer-readable instructions. The profiling tool, when executed, generates a runtime metric, the runtime metric including an application metric and a non-application-code metric. The profiling tool generates the application metric from a software application and the non-application-code metric from a non-application-code component used by the software application.

BRIEF DESCRIPTION OF THE DRAWINGS

Certain embodiments of present invention will now be described, by way of examples, with reference to the accompanying drawings, in which:

FIG. 12 is one example of a messaging protocol that be used by the profiling tool.

Throughout the drawings, identical reference numbers indicate similar, but not necessarily identical, elements.

DETAILED DESCRIPTION OF THE PREFERRED EMBODIMENTS

I. Introduction and Definitions

Figure 1:
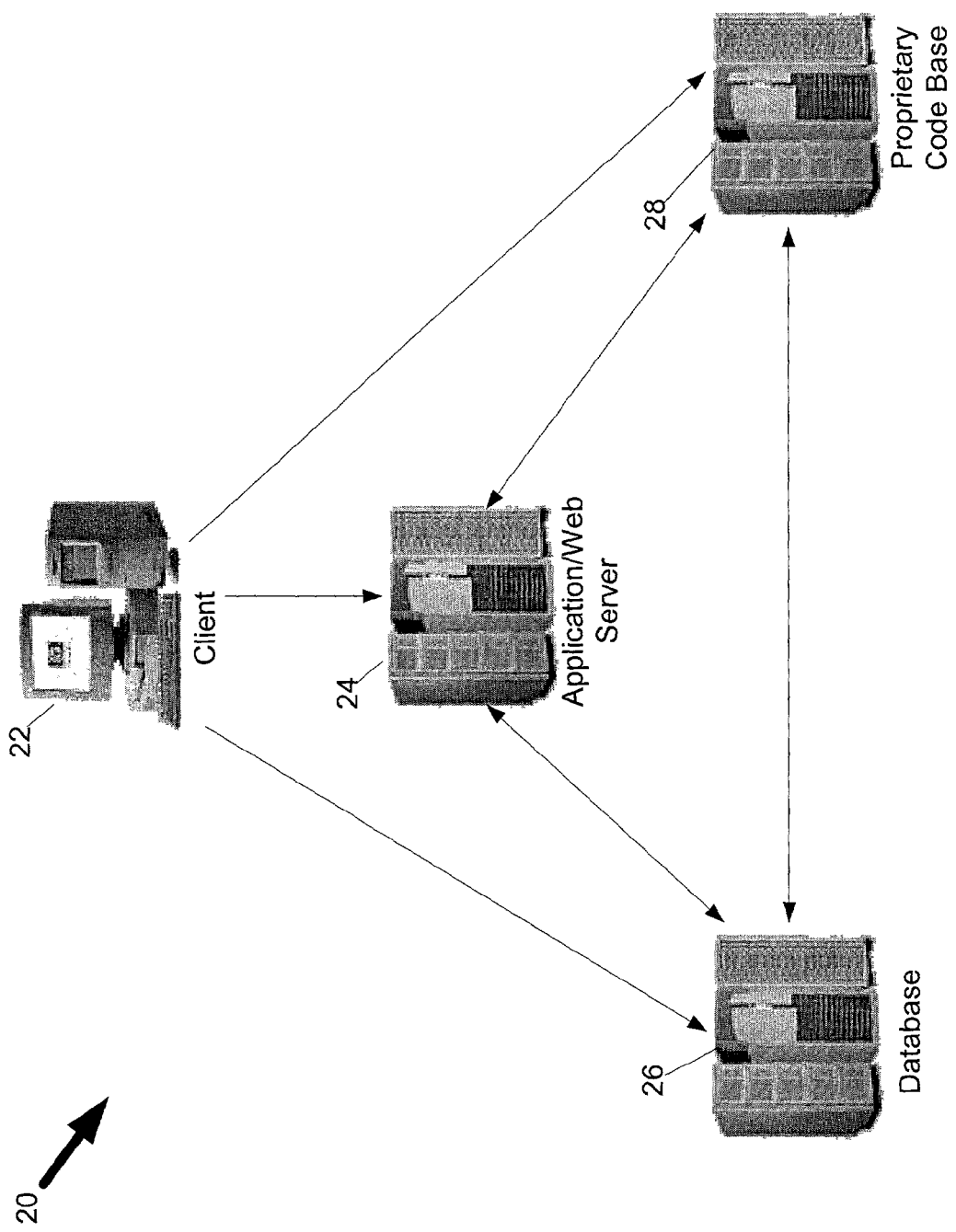
FIG. 1 is a high-level flow diagram illustrating one example of a distributed processing architecture, with separate application, database, and proprietary code base servers.

The present invention is a method and system for comprehensively profiling a runtime environment of a software application in a non-intrusive manner. FIG. 1 illustrates one of many potential embodiments of a profiling system (or simply "the system") 20 in a distributed processing environment. The profiling system 20 can be incorporated in a wide variety of different embodiments, and can include a wide variety of different interfaces, software applications, operating systems, programming languages, object libraries, function libraries, computer hardware, architecture configurations, processing environments, operating systems, and other environmental characteristics. The profiling system 20 can be applied to potentially any component in FIG. 1.

A. The Runtime Environment

The runtime environment of a software application profiled by the system 20 includes two primary types of software or computer code components, application-code components and non-application-code components.

1. Application-Code Components

The first type of code component that can be profiled by the system 20 is the software application ("application-code" component). In many embodiments of the system 20, the application code will be an application or applet (collectively "application code") written in the platform-independent programming language of JAVA®. JAVA is a registered trademark of Sun Microsystems, Inc., located in Mountain View, Calif. However, the invention is not limited to profiling JAVA application code only. For example, the present invention can be applied to any platform-independent software application.

A "platform-independent" software application means that the application code is "platform neutral" (e.g. that it can be distributed and run across different technical platforms). "Platform-independent" is synonymous with "platform neutral" with respect to the types of software applications that can be profiled by the system 20. An example of platform neutral application-code is "bytecode" in the Java programming language. Alternative embodiments of the system 20 may utilize other platform-independent programming languages, and/or platform-independent techniques (such as virtual machines or other interfaces) not related to the programming language of Java or similar languages such as C#. An example of the latter is the PA-RISC application emulation environment provided by the Aries runtime environment on HP-UX running on the Itanium processor family.

As discussed above, virtual machines and other forms of interfaces (collectively "virtual machine interfaces") between a software application and the underlying technical architecture and operating environment (collectively "platform") can render the software application "neutral" to any particular platform. Virtual machine interfaces can transform a computer programming language not known for high portability and platform neutrality, into a "platform-independent programming language." Other alternative embodiments of the system 20 do not require the use of a virtual machine interface.

Platform-independent programming languages and techniques typically facilitate platform neutrality and portability by positioning an interface layer between the software application and the underlying technical platform, rendering the underlying technical platform transparent to the software application. The software application can thus interact with the highly abstract and generic virtual machine interface, instead of a particular platform with platform specific characteristics. Thus, it is not uncommon for a virtual machine interface to incorporate code components written in a variety of different languages. This means that the software application using the virtual machine interface typically interacts with and utilizes computer code components that are written in one or more programming languages that are different from the programming language of the software application itself. In a virtual machine interface, the executing of a software application utilizing the virtual machine necessarily invokes computer code components within the virtual machine that enable the virtual machine to function as a virtual machine.

One common example of a virtual machine is the "Java virtual machine" ("JVM") that is typically used in conjunction with software applications and applets (collectively "applications") written in Java. However, the Java virtual machine can be configured or extended to operate for other programming languages rendering those languages potentially "platform independent." Similarly, other virtual machines designed with a particular application language in mind can be configured to allow utilization by application code components of a different type. For example, a C++ virtual machine could render C++ "platform independent."

There are many different combinations and environments that can utilize one or more different embodiments of the profiling system 20. However, platform neutral architectures and interfaces tend to present greater profiling challenges than other architectures and platforms due to the different language combinations, the nature of virtual machines, and the greater number of code components that typically need to interact with each other when platform neutral techniques are used. Despite the difficulties associated with such environments, the system 20 can comprehensively profile platform-independent runtime environments as well as environments based on more traditional structures and languages, in a non-intrusive manner. The system 20 does not need to utilize embedded agents to obtain profiling information (e.g. "runtime metrics"). Moreover, use of the profiling system 20 does not require any special preparation of the software application. The profiling system 20 can be invoked either before or after the software application to be profiled is executed. Use of the profiling system 20 does not require any cognizance of the profiling system 20 or a known or expressed intention by a human user or automated system utility (collectively "invocation interface") to profile the software application, at the time in which the software application is executed.

2. Non-Application-Code Components

The second type of code component includes all types of code components not included in the application code component. The second type of code component can be referred to as "support code," "environmental code," or simply "non-application-code." Non-application-code includes any code component that does not reside within the application code component, but is needed by the application code in order for the application code to function properly. Categories of non-application-code can include libraries of reusable functions (written in programming languages that are either identical, similar, or different than the software application), libraries of reusable objects, databases, network communication tools, code used for the functioning of the virtual machine, the operating system, and assembly language communications to the underlying hardware on the system 20.

a. External Instrumentation Code

Amongst other non-application-code components, the system 20 includes an "external instrumentation" subsystem of external instrumentation code ("instrumentation code") that can perform CPU (central processing unit) sampling and that can provide a communication facility to incorporate "traces" generated by the application code. Traces are described in greater detail below. As described below, the external instrumentation subsystem used by the system 20 is non-invasive to the software application. Typically, the external instrumentation subsystem will function through the operating system, and thus can be referred to as a "kernel profiling" subsystem that includes "kernel code" components. Alternative embodiments may utilize other forms of external instrumentation. Kernel instrumentation is used in a preferred embodiment because instrumentation processing is closely related to core operating system functionality, and can be used to monitor operating system functions such as launching applications and allocating system resources. Regardless of the specific type of external instrumentation, the external instrumentation subsystem includes instrumentation points that allow runtime measurements, optimizations, and extensions to be included in the runtime metrics generated by the system 20.

b. Virtual Machine Code ("VM CODE")

Code components relating to the virtual machine can be referred to as "virtual machine code components" or "virtual machine code." Code components written in a programming language different than the language of the software application can be referred to as "native code components" or "native code." In a typical Java environment, the terms "virtual machine code" and "native code" are generally synonymous because the code making up the virtual machine is typically written in a non-Java language such as C or C++. Use of the profiling system 20 does not require the embedding of "agents" into the support code or environmental code being profiled.

c. Other Types of Non-Application

There are numerous other types of non-application code components. These include platform specific libraries of reusable functions (written in programming languages that are either identical or similar to, or different from, the software application), libraries of reusable objects, the operating system, and assembly language communications to the underlying hardware on the system 20. Operating systems are computer programs with their own code components and processing. Many other types of non-application code relate to particular devices or communication protocols. The system 20 is capable of generating runtime metrics for many such non-application-code components.

B. Runtime Metrics

The profiling system 20 analyzes the runtime environment of the application-code-component and the non-application-code component(s) used by that software application to support the running of the application-code component. A runtime metric can be any characteristic or attribute relating to the runtime environment of the software application. A time-stamped compilation log of the software application is one example of a runtime metric. Many embodiments of the system 20 will generate multiple runtime metrics relating to the runtime environment, each capturing a different aspect of the system under measurement. There are a wide variety of different runtime metrics that can be tracked and reported by the system 20. Some runtime metrics relate to the overall use of an application ("aggregate runtime metrics"). For example, one runtime metric may be the number of assembly level hits to the operating system that resulted from the execution of the software application. Other aggregate runtime metrics can include the length of operating system time consumed by the assembly level hits, the compilation time of the software application, kernel timing clocks ("KTC"), and a time-stamped compilation log. Alternative embodiments may utilize a wide variety of different runtime metrics.

Runtime metrics can also relate to a particular function, routine, object or file ("component runtime metrics"). One example of a component runtime metric is the percentage of KTC time that was consumed by a particular process, method, or function (collectively "instruction"). Other examples of component runtime metrics include assembly level hits resulting from the particular component, the time consumed by the assembly level hits by the particular component, the order in which the routines were accessed, the filenames accessed by the particular routine, and the communications passed between routines. Alternative embodiments can include other forms of class, method, process, or function information.

Runtime metrics can also be referred to in relation to the particular structural component. For example, a kernel metric is a category of one or more runtime metrics generated by the profiling system 20 that relate to the external instrumentation (e.g. kernel). Similarly, a native-code metric is a category of one or more runtime metrics generated by the profiling system 20 from the native-code components in a native-code library. An application metric is a category of one or more runtime metrics generated by the profiling system 20 from the application-code components in the software application. The application metric can include both class (e.g. object) information and method (e.g. process) information, in addition to information relating to data structures and particular variables. An operating system metric is a category of one or more runtime metrics generated by the profiling system 20 that relate to the operating system. In many embodiments, operating system metric is synonymous with kernel metric. A virtual machine metric is a category of one or more runtime metrics generated by the profiling system 20 that relate to the virtual machine. Thus, in many circumstances, virtual machine metric is synonymous with native-code metric.

Runtime metrics can also provide information relating to the compilation of various components, especially when those components are compiled at runtime. A compilation metric is a category of one or more runtime metrics generated by the profiling system 20 that relate to the compiling of a code component used by the software application. The compilation metric can include a compiler log that tracks the order and date/time of compilation or de-compilation. With certain programming languages such as Java, methods and routines can be re-compiled in a dynamic (i.e., non-static) manner at runtime. Different embodiments of the system 20 can focus different levels of attentiveness on different categories of runtime metrics.

C. Hardware Configuration

Returning to FIG. 1, the profiling system 20 can be invoked by means of a client computer ("client") 22. The invocation of the profiling system 20 can be through a user accessing the client 22 through a user interface, which is a type of invocation interface for the system 20. Other types of invocation interfaces can exist for the system 20. For example, the profiling system 20 can also be automatically invoked by a particular event (such as a failure or error) or an elapsed period of time. Thus, the profiling system 20 can be configured to activate periodically in an automated fashion by the client 22 or some other computer, without any human intervention.

The client 22 can be any type of device capable of communicating with another device, including but not limited to a desktop computer, laptop computer, work station, mainframe, mini-computer, terminal, personal digital assistant, satellite pager, or cell phone. The software application can be executed from a different client than the client 22 used to invoke the profiling system 20.

The application/web server 24 typically houses the software application profiled by the profiling system 20. As described above, the software application may require the use of a native-code library at runtime. The native-code library can reside in: the application/web server 24; a proprietary code base server 28; partially in the application/web server 24 and partially in the proprietary code base server 28; or in some other server or combinations of servers. Any device capable of running a software application and communicating with other devices can potentially serve as an application/web server 24. In many embodiments, the application/web server 24 will possess greater computing power than a client 22 because the application/web server 24 will often need to support numerous clients 22. The client 22 can communicate with the application/web server 24 in a wide variety of different ways. The client 22 and application/web server 24 can be connected by a Local Area Network ("LAN"), a Wide Area Network ("WAN"), the Internet, an extranet, an intranet, a wireless network, or any other form of device-to-device communication. In many embodiments of the system 20, the invocation interface invoking the profiling system, the profiling system 20, and the software application will each reside in different devices and thus are remote from each other. It may be the case that some or each of various locations is protected and separated by a firewall. The system 20 can still be launched and fully utilized in such an environment, despite the remote location and the existence of one or more firewalls, so long as the software application can itself be accessed remotely through a user session. Moreover, the profiling system 20 does not interfere or modify the flow of control in the software application.

The profiling system 20 can also include additional components such as a database 26 and/or a proprietary code base 28. The database 26 can be located on a separate server reserved exclusively for the database. The configuration of the database 26 is largely dependent on the software applications using the database. The database can reside in a wide range of different types of devices, just as the client 22 and application/web server 24 described above.

The proprietary code base 28 can contain libraries of reusable functions, libraries of reusable objects, the code components making up the virtual machine, native-code components, and virtually any other code component that is not application code. The proprietary code base can reside in a wide range of different types of devices, just as the client 22, application/web server 24, and database 26, as described above.

In most embodiments, the various hardware components in FIG. 1 can all communicate directly with each other. Different embodiments can utilize different degrees of distributed processing techniques and structures.

II. Runtime Metrics

Figure 2:
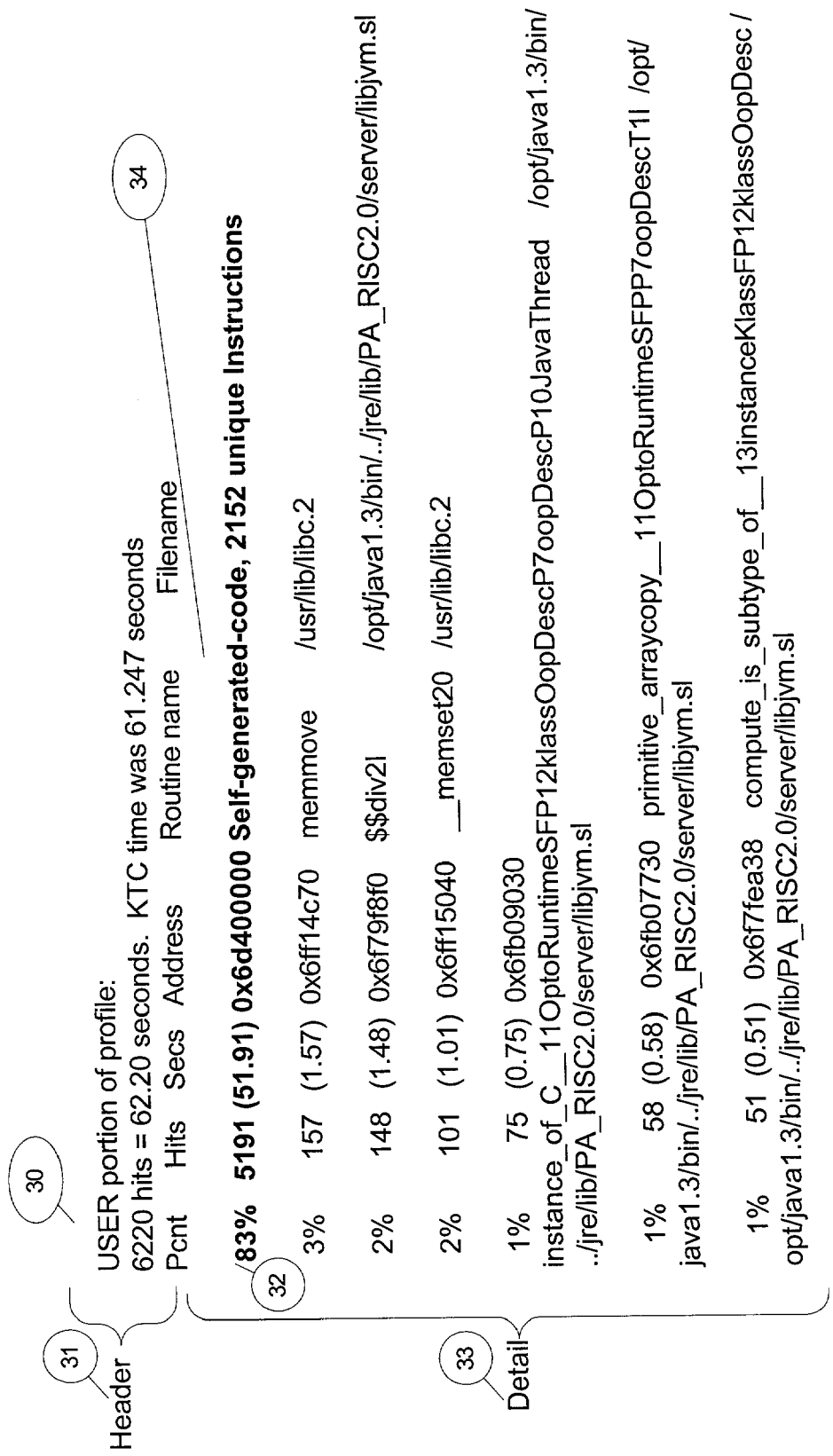
FIG. 2 is a data listing illustrating one example of the runtime metrics generated by a prior art profiler.

FIG. 2 is an example of a runtime metric listing generated by a prior art profiling tool. The runtime metrics illustrated in the FIG. 2 exemplify one of the weaknesses in prior art profiling tools, the inability to comprehensively profile both the software application and the non-application-code components that are necessary for the functioning of the software application. The particular example illustrated in FIG. 2 relates to a software application written in the programming language of Java. The example in FIG. 2 is widely applicable to other platform-independent programming environments that utilize virtual machines and similar interfaces.

At the top of the profile is an indication that the runtime metric relates to a user portion 30 of the profile. "User" in this context refers to non-privileged mode execution of code, a feature supported by most existing operating systems. FIG. 2 reveals both a header section 31 containing a series of "aggregate runtime metrics" and a detail section 33 listing runtime metrics relating to particular instructions (e.g. "component runtime metrics"). The aggregate runtime metrics are displayed at the top of the listing and the component runtime metrics are displayed in the rows of data under the column headers of percentage, hits, seconds, address, routine name, and filename.

The runtime metrics include useful data such as the total number of "assembly level hits" (6,220 hits), the amount of processing time consumed by those "assembly level hits" (62.20 seconds), and the kernel timing clocks (KTC) components (61.247 seconds). The prior art profiler is significantly less successful in its attempt to provide metrics relating to application-code components ("application metric"). This inability to profile the internal components/instructions of the software application is evidenced by the first row of data in the detail section 33. For the purpose of highlighting this important row, the data is displayed in bold. The first row of component runtime metrics 33 aggregates all of the application metrics into a single row, failing to identify any of the objects, routines, or other information internal to application-code components. The 83% at 32 reveals the percentage of assembly level hits that resulted from all application-code components, in the aggregate. Thus, the address information of "0x6d400000" is meaningless because the various components of the software application actually reside at different memory locations. Similarly, the routine name at 34 of "Self-generated code" does not identify any of the routines and correspondingly, no filenames are indicated. "2152 unique instructions" fails to reveal any information about any particular filename or routine. The inability to distinguish between different application-code components is an example of prior art limitations with respect to the profiling of runtime environments. In contrast, the system 20 has the ability to distinguish between different application code components in generating runtime metrics.

Figure 3:
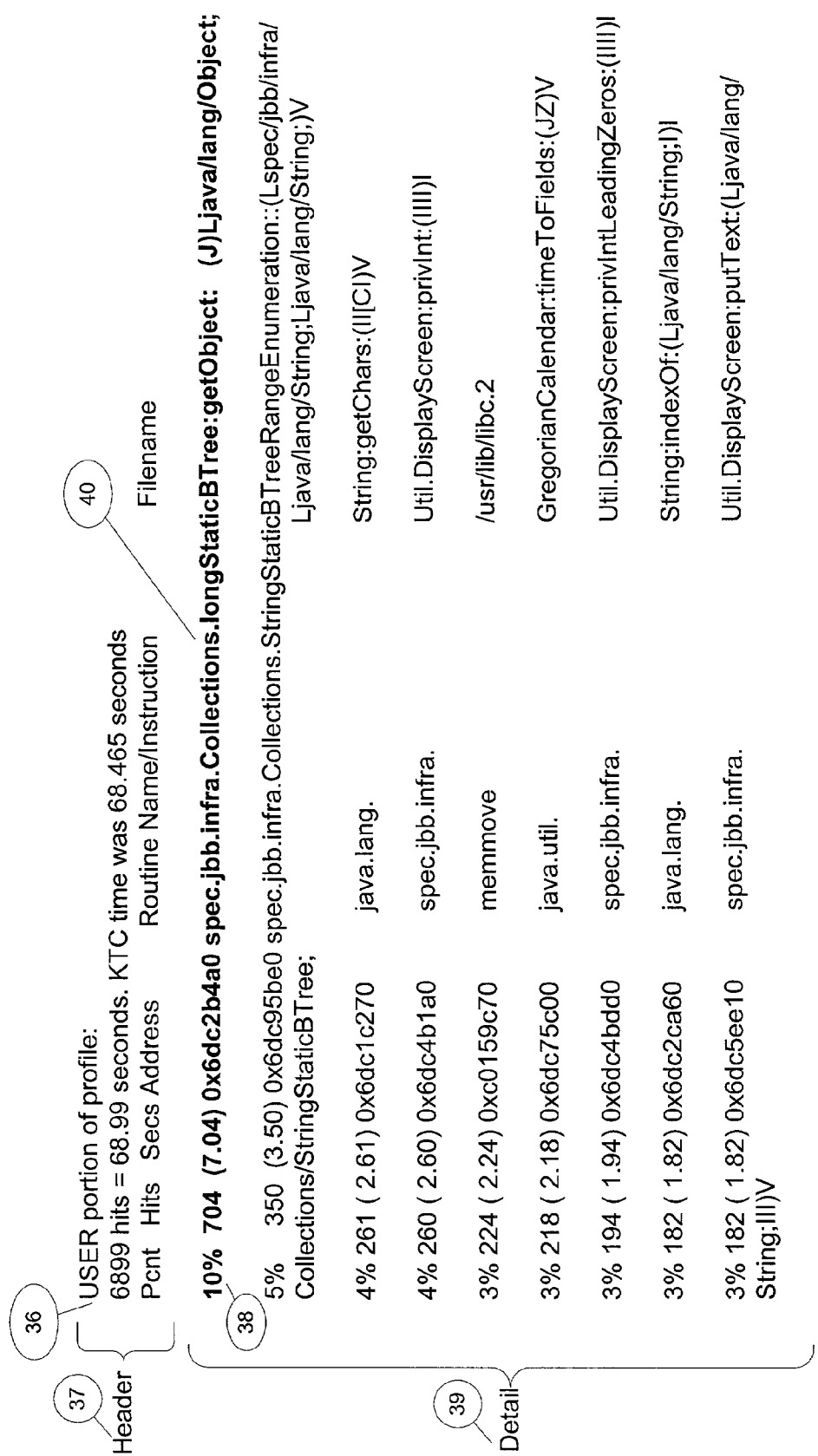
FIG. 3 is a data listing illustrating one example of the runtime metrics generated by a profiling tool capable of performing comprehensive runtime metrics.

FIG. 3 illustrates the runtime metrics of the profiling system 20 according to principles of the present invention. The data from FIG. 3 can be contrasted with the data listing in FIG. 2 to illustrate the improved functionality of the profiling system 20, and the runtime metrics that can be generated. A user profile 36 in the profiling system 20 is able to profile both application-code components as well as non-application-code components in a comprehensive and specific manner, without any embedded agents. There can be aggregate runtime metrics 37 in FIG. 3 that were not captured as aggregate runtime metrics 31 in FIG. 2 because the inability to accurately profile application components to generate application metrics affects the ability to generate aggregate runtime metrics. Thus, the ability to the system 20 to obtain information relating to individual instructions, objects, functions, and other information that exists within application-code components, also serves to make the system 20 a better generator of aggregate runtime metrics, kernel runtime metrics, and compiler runtime metrics than prior art profiling tools.

Some of the distinctions between the component runtime metrics 33 in FIG. 2 and the component runtime metrics 39 in FIG. 3 are also illustrated in FIG. 3. The first row in FIG. 3 looks substantially different the first row in FIG. 2 because the application-code components are broken down into the various routines and objects of the software application. The percentage of 10% at 38 is much less than the 83% at 32 on FIG. 2 because the application-code components are broken down into individual components. Similarly, the number of hits (704), number of seconds (7.04), and address location (0x6dc2b4a0) relate to a particular routine name (longStaticBTree) and a particular filename (spec.jbb.infra.collections) at 40. The system 20 provides the ability to generate a detailed breakdown of runtime metrics relating to specific application-code components. This is in sharp contrast to being limited to a single runtime metric that lumps together in a single "bucket," all runtime metrics relating to the application-code components.

The runtime metrics in FIG. 3 are only one example of an embodiment of the system 20. There are numerous other potential embodiments with a wide range of different runtime metrics that can be generated by the system 20.

III. System Components

The profiling system 20 can be embodied in a wide variety of different platforms, with a wide variety of different application programs written in a wide variety of different programming languages. Incorporating the profiling system 20 into an existing architecture may require changes to the existing architecture, depending on the capabilities of the existing architecture, in particular, the capabilities related to profiling and platform independent application support.

Figure 4:
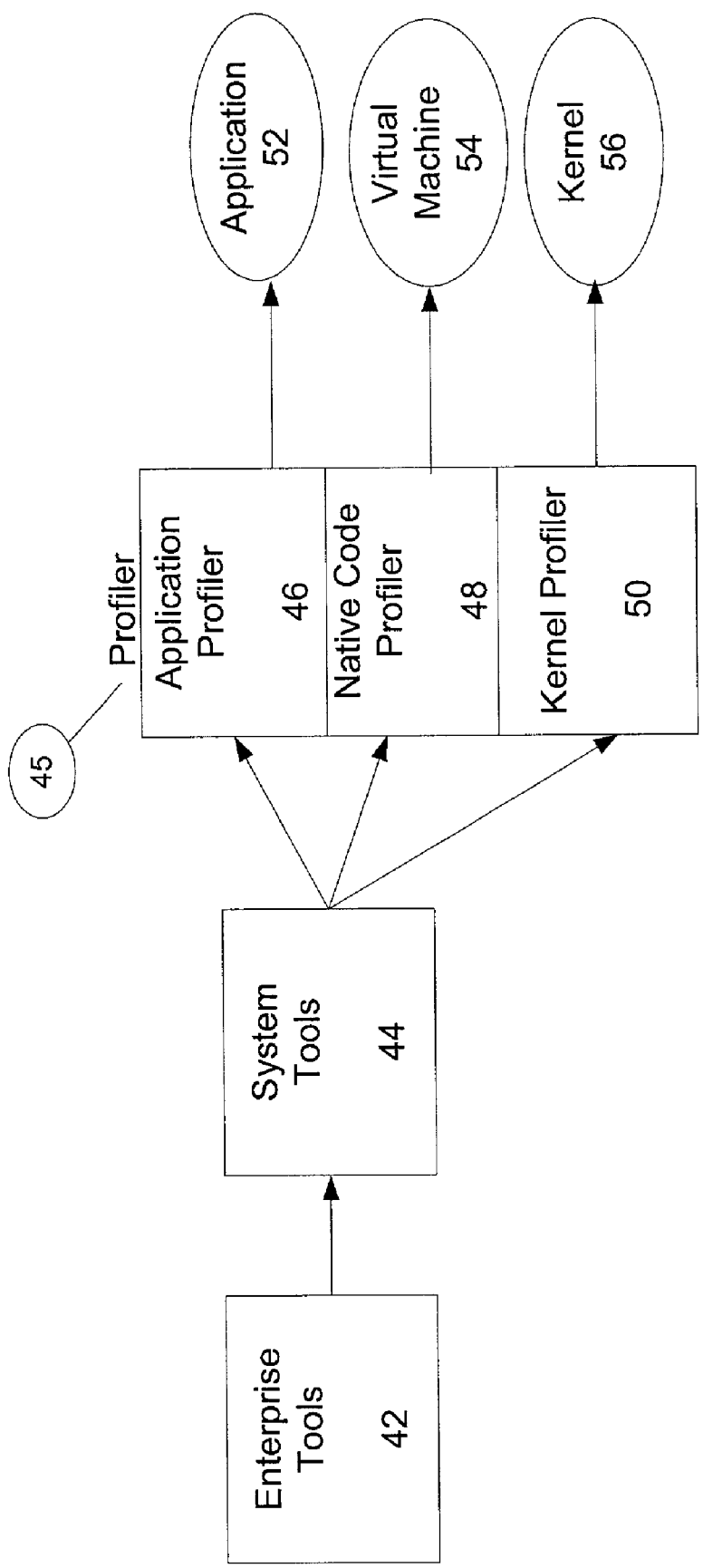
FIG. 4 is structural diagram illustrating the progression from enterprise tools, to system tools, to one example of a profiling tool capable of generating application metrics from a software application, virtual machine metrics from a virtual machine, and kernel metrics from a kernel.

FIG. 4 is a structural diagram of the profiling system 20 being used to profile the runtime environment of a software application 52 written in the programming language of Java. Alternative embodiments can employ different programming languages with different structures. The system 20 can be implemented in a wide variety of different embodiments, with each embodiment incorporating different management and information tools into the system 20.

On the left side of the diagram in an enterprise tool 42. Enterprise tools 42 are used to find a particular system, and to manage various components and communications across numerous different large systems. An enterprise view of information technology is a high level and comprehensive view of the information technology for an entire enterprise (e.g. company, government, or other organization). One example of commercially available enterprise tools is OpenView. OpenView is an enterprise-wide tool for managing large systems and networks. OpenView is a product of Hewlett-Packard Company, headquartered in Palo Alto, Calif. The profiling system 20 can be integrated with such enterprise tools, or other types and variations of such tools in order to maximize the benefit of runtime metrics generated by the system 20. In alternative embodiments, the profiling system 20 can be built with the same functionality of enterprise tools 42, removing the desirability of interfacing with other software products. The profiling system 20 does not need to incorporate enterprise tools 42 in order for the system 20 to function.

Moving towards the right side of the diagram, the various components become more specific to particular types of software components. The enterprise tool(s) 42 may interface with a system tool 44. The function of a system tool 44 is to monitor or profile an entire system, not the profiling of a particular runtime environment at the routine-level. For example, one type of system tool 44 may exist to support all of the accounting software systems used by a particular enterprise. In some embodiments, the profiling system 20 can also perform all of the functions of the system tool 44. This can be accomplished by interfacing with a commercially available system tool such as Glance, or by incorporating the desired functionality directly into the profiling system 20. Glance is a system level monitoring tool that provides information regarding the number of system calls and a wide variety of other operating system metrics. Glance is a commercially available product of the Hewlett-Packard Company, headquartered in Palo Alto, Calif.

A profiler or profiling tool 45 can be integrated with the enterprise tools 42 and system tools 44 described above. However, the integration or interfacing of the profiling system 20 with enterprise tools 42 and/or system tools 44 is not required for the functioning of the profiling system 20. Such functionality can be implemented directly into the profiling system 20. Moreover, such functionality is not required for the profiling system 20 to generate runtime metrics.

In some embodiments of the system 20, the profiler or profiling tool 45 used by the system 20 can simultaneously incorporate the functionality of one or more specialist profilers. An application profiler 46 is responsible for profiling the application code component. In an embodiment with a Java software application 52, the application profiler 46 is a Java profiler. Some Java embodiments of the system 20 incorporate customized and modified versions (the modifications are discussed below) of existing commercially available application profilers such as HPjmeter by Hewlett-Packard. In alternative Java embodiments of the system 20, the application profiling tool 46 does not interface with any other profiling tool, and all functionality is created within the application profiling tool 46 itself. In non-Java embodiments, the application profiler 46 is specific to the category or type of programming language used to write the software application 52.

The profiling tool 45 can also include a native-code profiling tool 48. In a Java embodiment of the system 20, much of the native-code will be in the form of the Java virtual machine 54. In non-Java embodiments, the native-code 54 being profiled can be the code for a virtual machine or some other form of interface. The existence of a native-code profiler 48 is not required by the system 20 if there is no native-code 54 to profile.

The profiling tool 45 can also include a kernel profiling tool 50 (or other form of external instrumentation tool) for profiling the kernel 56 of the runtime environment. The kernel is the core of an operating system, the portion of the operating system that manages memory, files, and periphery devices. The kernel is also the part of the operating system that launches applications and allocates system resources in a runtime environment. Some embodiments of the system 20 will incorporate modified versions of existing native code profilers 48 and kernel profiling tools 50. Other embodiments of the system 20 will provide all profiling functionality internally. In some embodiments, an operating system profiling tool is used in place of the kernel profiling tool, and the metric generated is called an operating system runtime metric.

Regardless of whether the profiling tool 45 used by the system 20 interfaces with other profiling tools or houses all profiling functionality internally, the profiling tool 45 used by the system 20 operates through the kernel 56 (or more generally, the operating system) to obtain the runtime metrics, including runtime metrics not relating to the operating system or kernel, such as application-code metrics. As described below, kernel instrumentation information and a method map can be used by the system 20 to provide comprehensive and non-intrusive profiling of the runtime environment of the software application. The system 20 can also incorporate other instrumentation external to the application-code components, to obtain external or kernel metrics.

Figure 5:
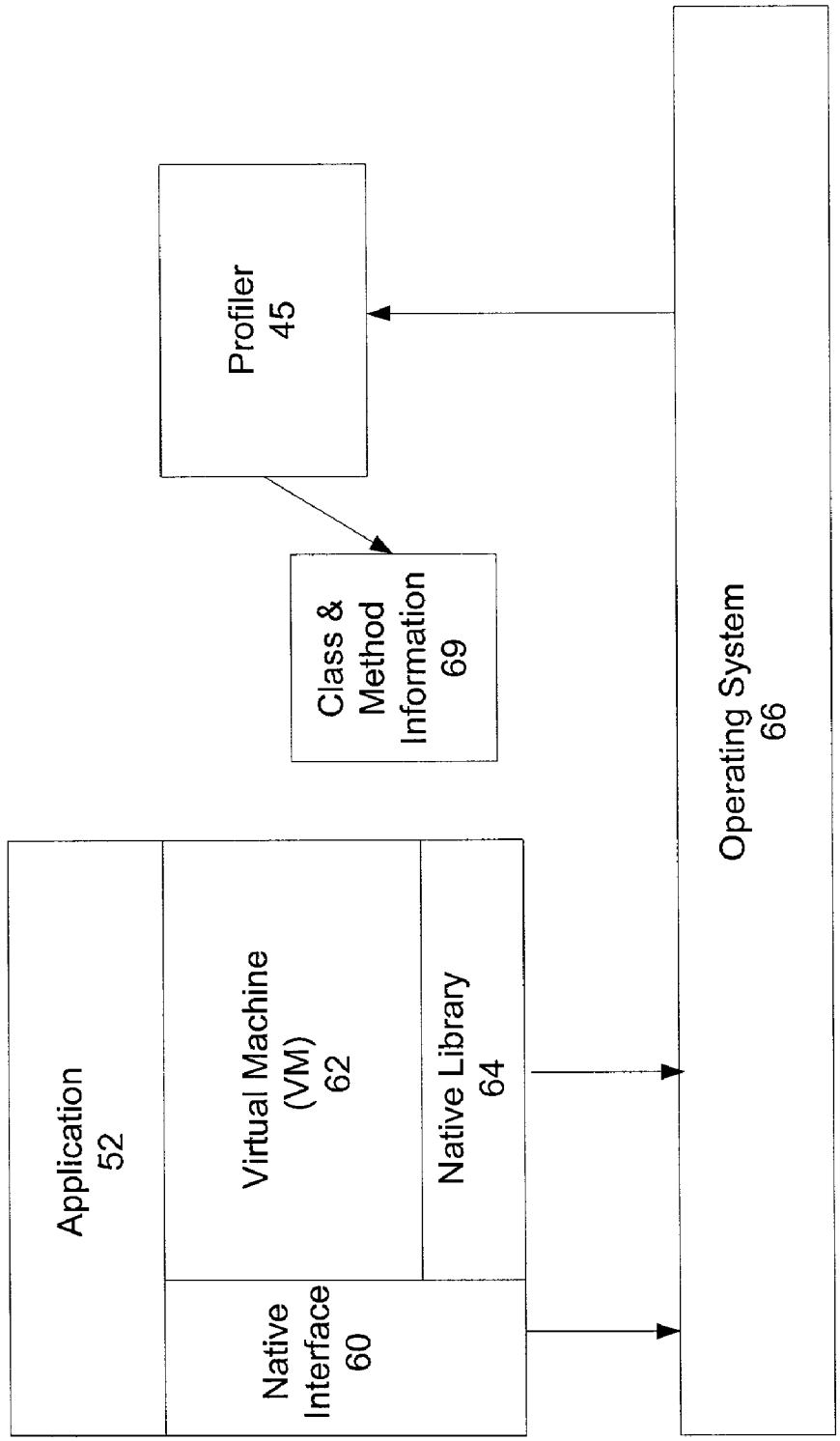
FIG. 5 is a structural diagram illustrating one example of a profiling system that can generate useful application metrics, including both class and method information, by communicating through the operating system.

FIG. 5 is a block diagram illustrating one example of an embodiment of the structure that can be incorporated into the system 20. At the top of the diagram is the software application 52. The software application 52 includes the executable application code component, and any other application-code components that can be utilized by the software application. In a Java embodiment of the system 20, the application code 52 is written in Java, and the application is either a Java applet or application (collectively "application").

Underneath the software application is a native interface 60 and a virtual machine 62. In a Java embodiment of the system 20, the native interface 60 is a Java native interface ("JNI") and the virtual machine is a Java virtual machine ("JVM"). Java Native Interface 60 is a standard programming interface for writing Java native methods and embedding the Java virtual machine 62 into native (non-Java) software applications. One primary goal is interface compatibility of native method libraries across all Java virtual machine implementations. The Java virtual machine (JVM) 62 is a virtual computer, typically implemented in software on top of an actual hardware platform and operating system, that runs compiled Java programs. The Java virtual machine 62 facilitates portability and platform independence, as discussed above. In non-Java embodiments, the native interface 60 and virtual machine 62 perform essentially the same functions as they do in the Java embodiments, although more customization may be required in such embodiments. Moreover, even non-Java embodiments can use a Java virtual machine 62. In a non-Java embodiment, native-code components are supporting code components that are written in a programming language that is different from the programming language used to write the software application 52 and other application-code components.

Beneath the virtual machine 62 is a native library 64. In many embodiments, the virtual machine 62 will include non-application-code components written in a different language than the software application 52. The code components used to run the virtual machine can require the use of reusable functions and other code components. Such code components can be stored as native-code components in the native library 64.

Underneath the native interface 60 and the native library 64 is an operating system 66, which includes a kernel for core operating system functions such as launching (executing) software applications, allocating system resources, managing memory, managing files, and managing periphery devices. The system 20 can be embodied with a wide variety of different operating systems such as Unix, Linux, Windows, and other commercially available and/or proprietary operating systems.

Figure 6:
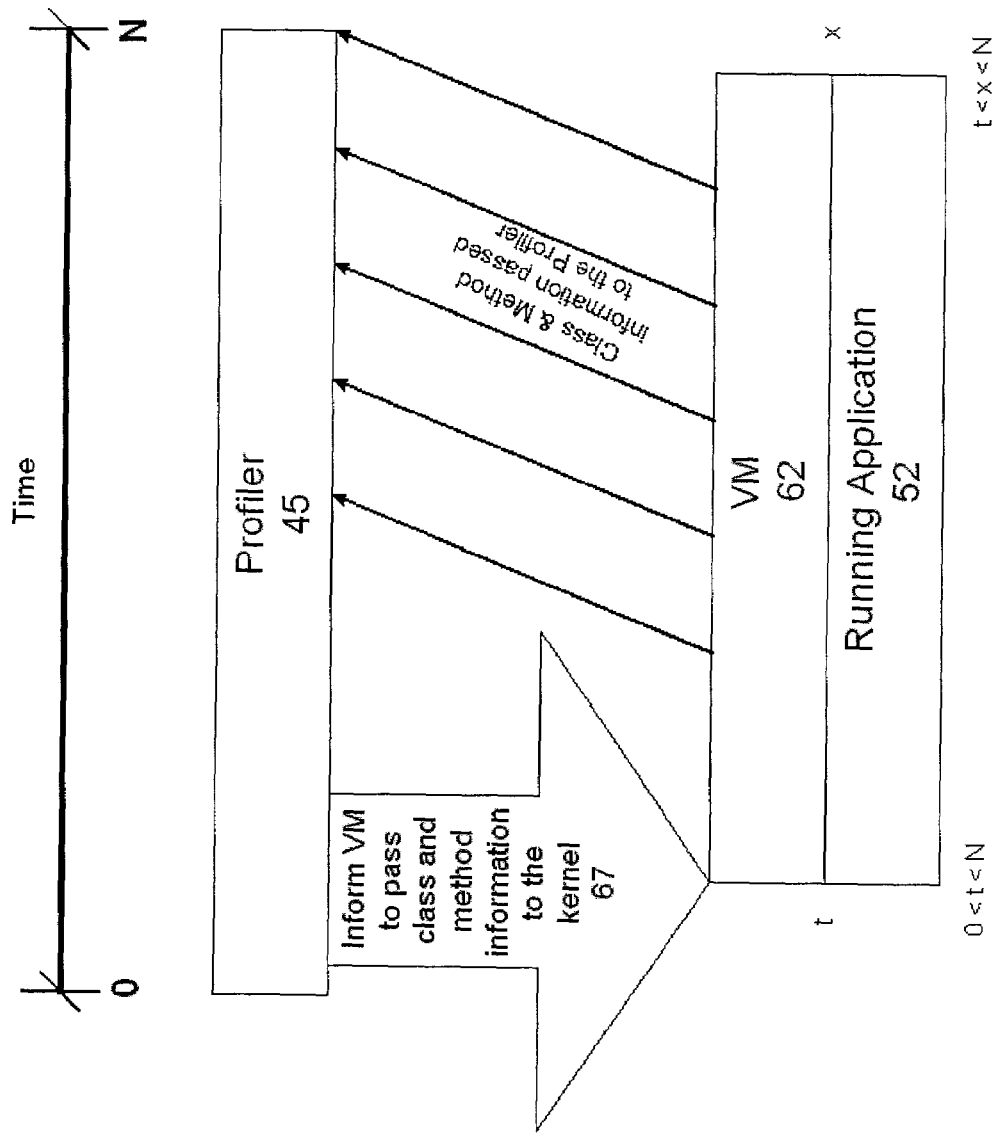
FIG. 6 is a time-flow diagram illustrating one example of a profiling system being invoked before the execution of a software application.

In many embodiments of the system 20, a profiling tool 45 obtains runtime metrics through the operating system 66 as illustrated in FIG. 6. Between the profiler 45 and the block of code including the application 52, the native interface 60, the virtual machine 62, and the native library 64, is the operating system 66. The interactions between the profiling tool 45 and the operating system 66 are described in greater detail below.

The profiling tool 45 produces a comprehensive set of runtime metrics including class and method information internal to the software application 52. As discussed above, the comprehensive information illustrated in FIG. 3 is in contrast to the "self-generated code" listing in FIG. 2.

IV. Use of the Profiling Tool

The profiling tool 45 used by the system 20 can be applied before the software application 52 is executed or after the software application is executed. At the moment in which the invocation interface triggers the execution of the software application 52, the system 20 need not be cognizant of any intention relating to the profiling of the runtime environment for that software application 52 at the time that the software application 52 is executed. The system 20 does not require the use of embedded agents, and is designed to facilitate comprehensive profiling without intrusive measures to the software application (external instrumentation such as kernel profiling is non-intrusive). Nor does the system 20 require any special form of preparation or modification of the software application 52 in order to perform comprehensive profiling of the software application 52.

FIG. 6 is timeline diagram illustrating the invocation of the profiling tool 45 before the invocation of the virtual machine 62 or the software application 52. In such an embodiment, the profiling begins from the initialization of the virtual machine 62. The entire life cycle of the software application 52 can be profiled. At 67, the passing of class and method information to the kernel can begin. In many Java embodiments of the system 20, a command line flag at 67 is used to enable the passing of class and method information to the kernel (or other form of external instrumentation) so that the profiling tool can then generate runtime metrics, including but not limited to kernel metrics (or other form of external instrumentation metrics).

Figure 7:
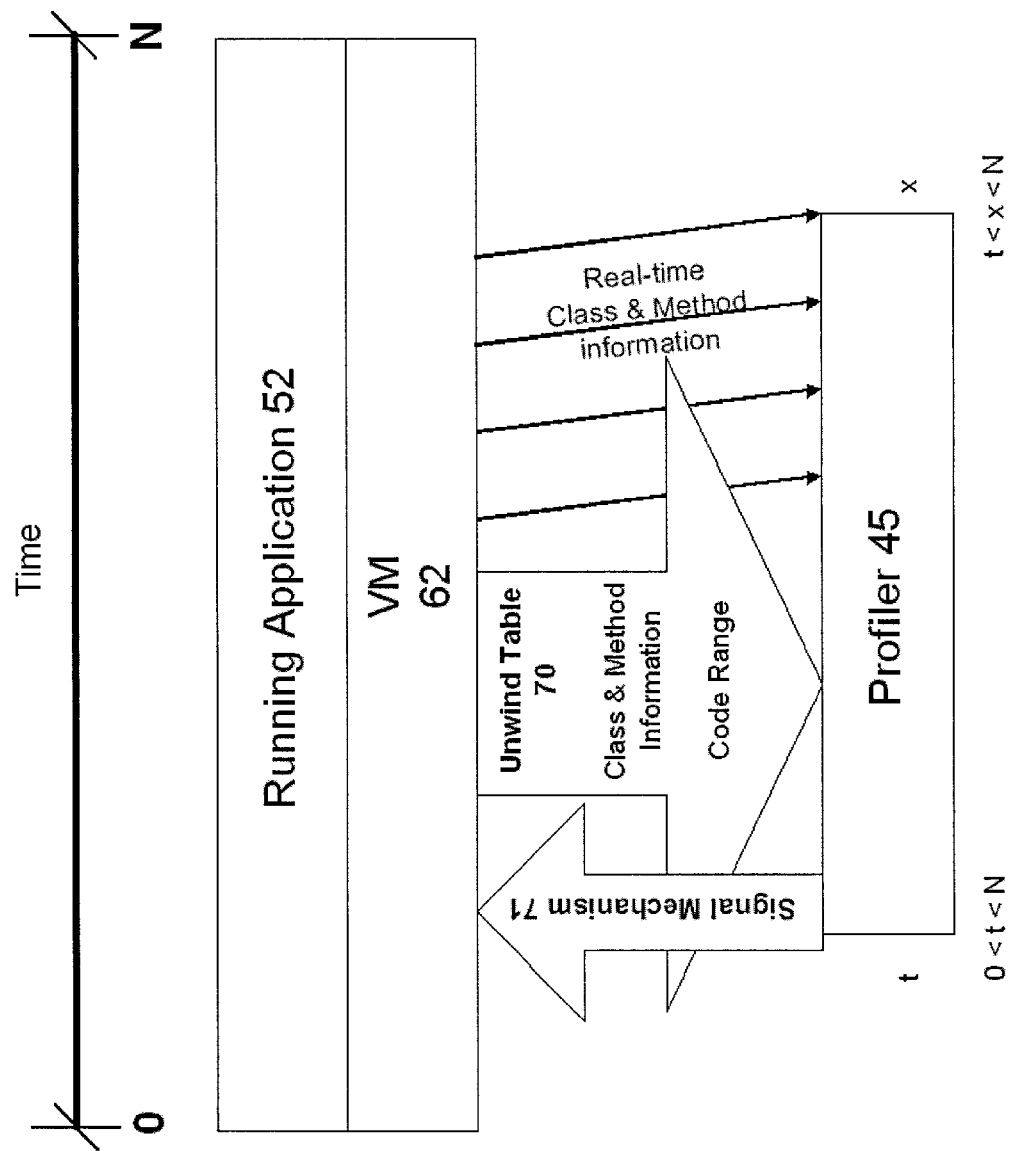
FIG. 7 is a time-flow diagram illustrating one example of a profiling system using an activation signal to comprehensively profile a software application that is executed before the invocation of the profiling system.

FIG. 7 is a timeline diagram illustrating the invocation of the profiling tool 45 after the software application 52 has been running for some time. Such a use of the system 20 uses a method map 70 in the runtime environment and a signal mechanism 71 to activate the communication between the runtime environment and the kernel profiling interface. The profiling tool 45 can asynchronously attach to the running application 52.

The method map 70 is tied to the particular virtual machine 62, so the method map 70 should be part of the runtime environment for software applications 52 profiled by the system 20. In many Java runtime embodiments of the system 20, the method map is a data structure with the attributes of a hash table data structure. The first_instruction of each entry in the method map is the hash table key. Each hash table slot corresponds to a subspace of memory that holds a finite group of platform specific versions of application code methods. Each slot chain in the method map 70 can hold the method map entries in the corresponding memory subspace. Each slot chain can be ordered by the first_instruction for the entries within that chain. The method map is described in greater detail below. The signal mechanism 71 can be used to indicate when the profiling time commences, and also when the profiling time is to expire, and the profiling system 20 is to cease processing. Profiling can also be silently discontinued by terminating the profiler 45. As illustrated in FIG. 7, the profiler tool 45 can cease processing before the software application 52 terminates.

V. The Method Map

Figure 8:
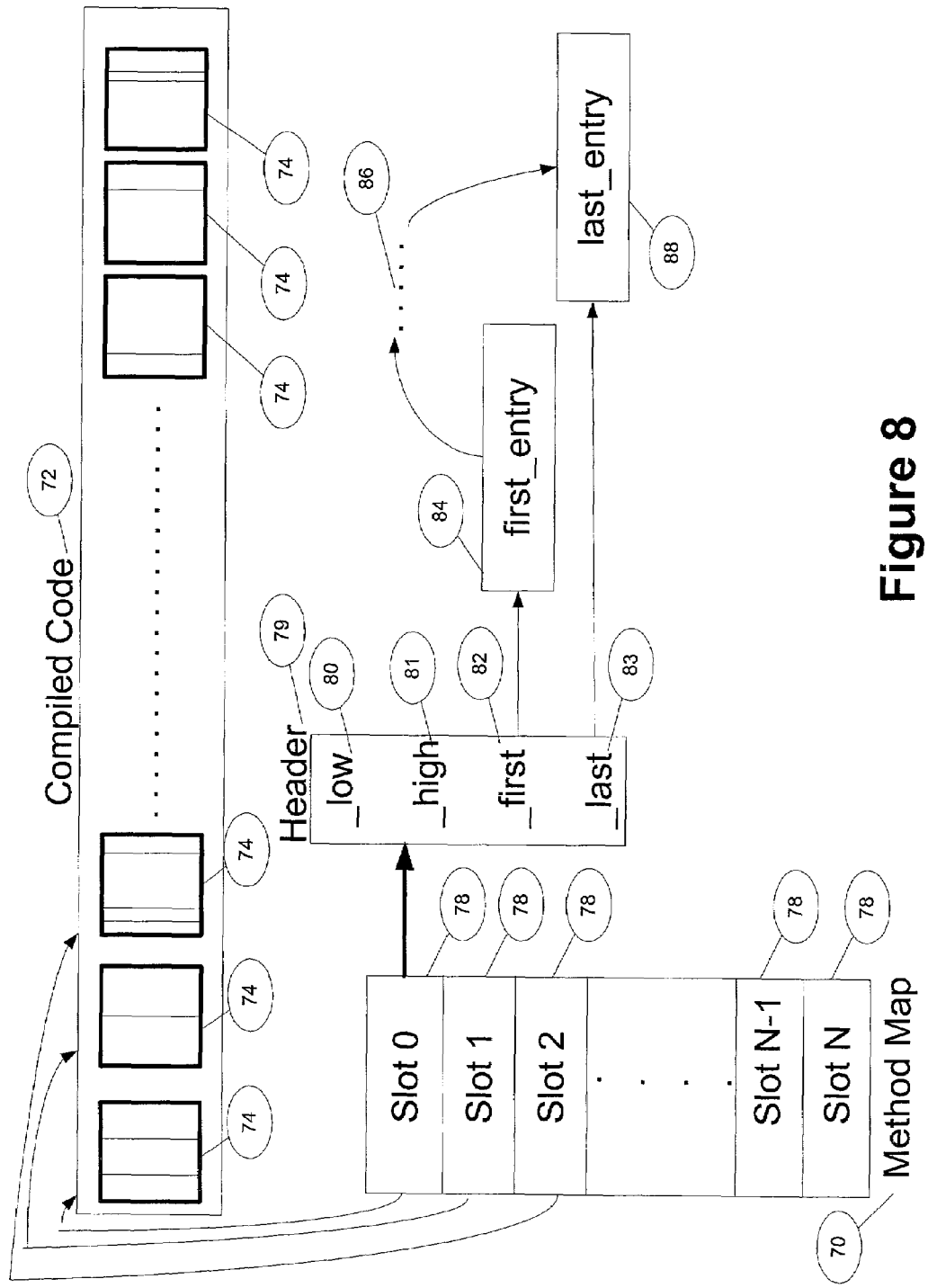
FIG. 8 is a process-flow diagram illustrating one example of how a method map can be used by a profiling tool.

The method map 70 is used by the system 20 to correlate the runtime metrics at the individual routine or "instruction" level. FIG. 8 is an illustration of the how the method map 70 can be used by the system 20. The execution of a particular instruction, method, thread, routine, or process (collectively "instruction") in the runtime environment is recorded in a data structure by the profiling system 20, so that runtime metrics can be generated that include application metrics relating to the various instructions.

In a Java runtime embodiment, a runtime compiler creates platform specific versions of instructions (e.g. compiled code 72) that are executed by the application. The runtime compiler can be instructed to generate platform specific versions of all instructions, or can be limited to generate platform specific versions of only a few selection instructions. A method map table can be instantiated to act as a repository of information about instructions that currently have platform specific versions. The method map table can capture such information as the application server 24 on an instruction-by-instruction basis as the runtime compiler processes these routines to generate platform specific versions. In non-Java embodiments, other objects, data structures, and/or files can be used to fulfill the same functionality. The memory used to hold the platform specific versions of the routines can be logically partitioned into various subspaces 74, with each subspace holding a finite collection of the routines. The size of such sub spaces can be determined through consideration of the various tradeoffs, and alternative embodiments may utilize subspaces that vary widely in storage capacities.

In a Java runtime embodiment, a runtime compiler creates platform specific versions of instructions (e.g. compiled code 72) that are executed by the application. The runtime compiler can be instructed to generate platform specific versions of all instructions, or can be limited to generate platform specific versions of only a few selection instructions. A method map table can be instantiated to act as a repository of information about instructions that currently have platform specific versions. The method map table can capture such information as the application server 24 on an instruction-by-instruction basis as the runtime compiler processes these routines to generate platform specific versions. In non-Java embodiments, other objects, data structures, and/or files can be used to fulfill the same functionality. The memory used to hold the platform specific versions of the routines can be logically partitioned into various subspaces 74, with each subspace holding a finite collection of the routines. The size of such sub spaces can be determined through consideration of the various tradeoffs, and alternative embodiments that may utilize subspaces that vary widely in storage capacities.

A header table 79 can be used to further optimize the process of adding or deleting content from the method map 70. In the header table, _low 80 is the instruction_start for a first_entry 84 in the slot, _high 81 is the instruction_start for a last_entry 88 in the slot, _first 81 designates a first_entry 82, and _last 83 designates a last_entry 88. The first_entry 84 though last_entry 88 (including all entries 86 in between the first_entry 84 and the last_entry 88) in the slot can further contain method map entries (MethodMapEntries) such as the example displayed in Table A. In non-Java embodiments, the equivalent entry can be created.

TABLE A

| MethodMapEntries | |
|---|---|
| EntryType | _type |
| MethodMapEntry | *_next |
| Address | first_instruction |
| Address | last_instruction |
| Int | frame_size |
| MethodInfo | *_methodDescriptor |

Runtime metrics can be generated as a part of the process of adding or deleting entries from the method map 70. The runtime metrics can act as a correlator or "meta data" that helps the profiler in the system 20 generate application code metrics from samples observed by the profiler through the utilization of the kernel processing subsystem. If runtime metric collection is activated dynamically through the use of the signal mechanism, all the entries generated from the beginning of the application run are communicated to the profiler by traversing the method map table. The aggregate runtime metrics are generated by either aggregating the various component runtime metrics, and/or by using some of the additional tools and components described in FIG. 4.

Figure 9:
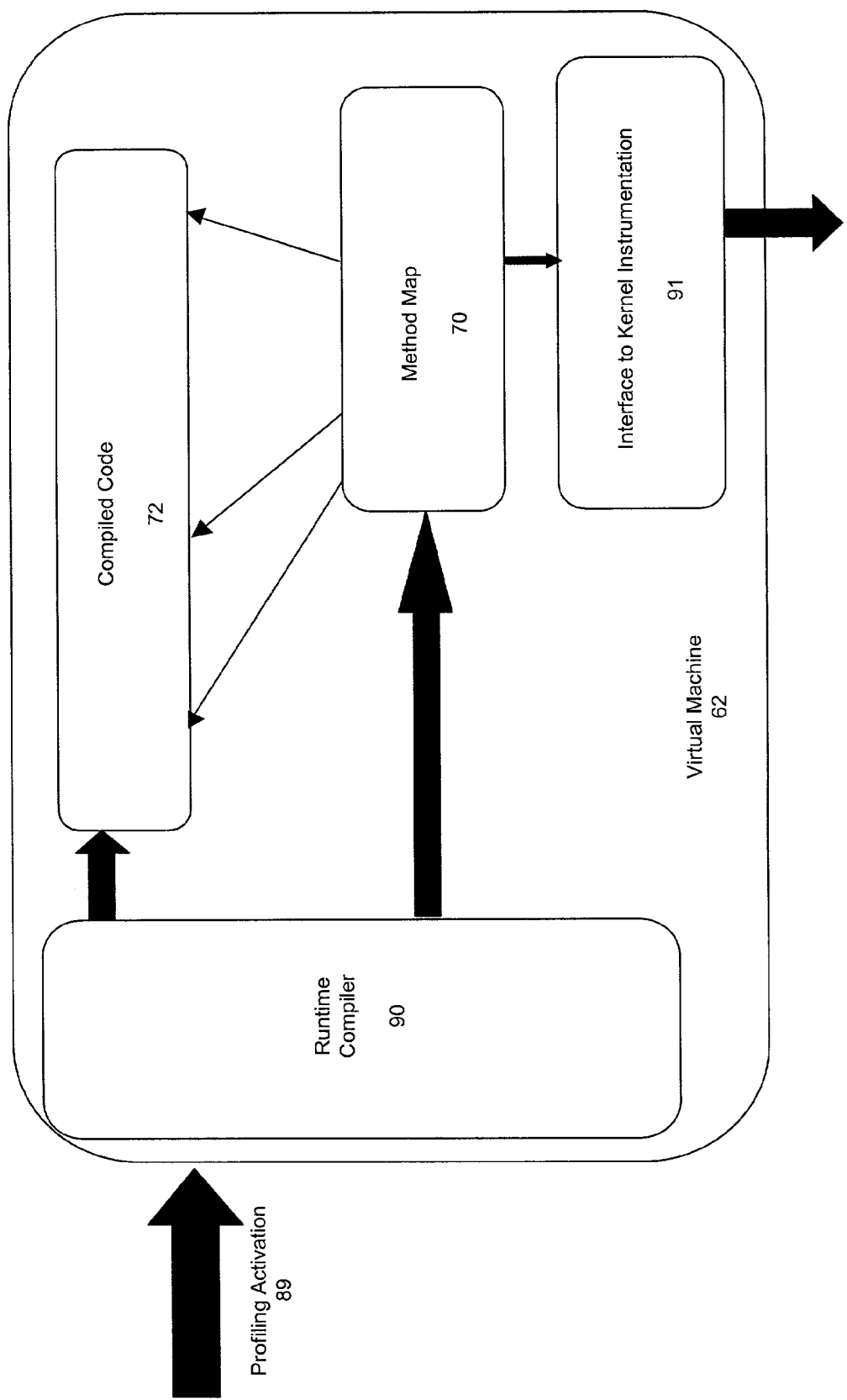
FIG. 9 is a process-flow diagram illustrating the inner workings of the virtual machine after the activation of the profiling mechanism.

FIG. 9 is a process flow diagram illustrating the inner workings of the virtual machine 62 after a profiling activation 89. A runtime compiler 90 generates the compiled code 72 and sends the relevant information to the method map 70. The interactions between the method map 70 and the compiled code 72 are described in greater detail above. The method map 70 communicates with the external instrumentation (such as the kernel) through an interface (such as a kernel instrumentation interface 91 ). Thus, in a preferred embodiment of the system 20, the data contained in the header table 79 of the method map 70 is sent to the kernel through the kernel instrumentation interface 91. Examples of external instrumentation subsystems such as the kernel profiling subsystem are described in greater detail below.

VI. External Instrumentation Subsystem

As discussed above, the system 20 uses an external instrumentation subsystem to capture traces generated by the application code 52 and to perform CPU sampling. In a preferred embodiment the system 20, the external instrumentation subsystem is a kernel profiling subsystem because instructions are ultimately performed at the operating system level. Regardless of the exact nature of the external instrumentation, external instrumentation provides a useful way for the system 20 to generate runtime metrics in a comprehensive and non-intrusive manner. Using kernel instrumentation, dynamic updates of compiled method information can be generated by the system 20. Use of kernel instrumentation requires minimal overhead to the running software application 52. Kernel instrumentation does not occupy any application resources such as a network port or a file descriptor on any client 22 or any other computer housing software code components in the runtime environment. Moreover, the entire kernel profiling subsystem does not occupy a single port on the client 22 or any other computer housing software code components used in the runtime environment. Kernel instrumentation can also be turned off if the profiling system 20 is not being used. The kernel profiling subsystem updates the compiled method data record in a dynamic manner.

Figure 10:
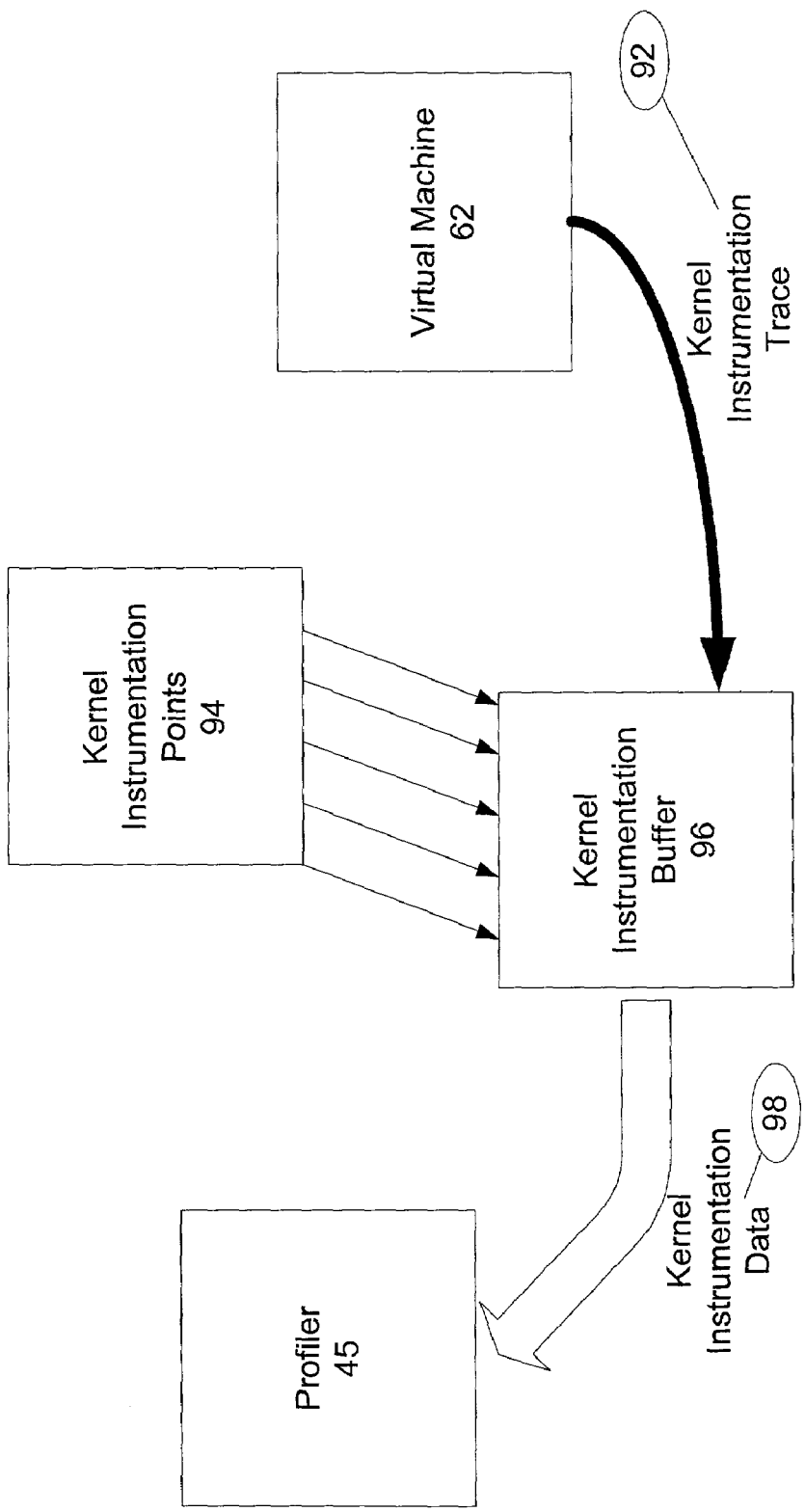
FIG. 10 is a process-flow diagram illustrating one example of a kernel processing subsystem, and how interactions between the kernel profiling subsystem and a virtual machine can be used to generate comprehensive runtime metrics.

FIG. 10 illustrates one embodiment of how the kernel and the virtual machine interface interact to enable the system 20 to provide comprehensive runtime metrics in a non-intrusive manner. The virtual machine 62 as described above is the interface between the software application 52 that is written in a platform-independent programming language. The underlying platform includes the operating system 66 and the kernel. The virtual machine 62 interacts with the kernel on behalf of the software application and the various code components used to support the software application in a runtime environment.

The virtual machine 62 can invoke the kernel instrumentation interface to generate a kernel instrumentation trace 92 to provide runtime environment information (e.g. the raw data that will ultimately be used by the system 20 to generate runtime metrics) to a kernel instrumentation buffer 78. Instrumentation buffers can be used to find out how many events of a given type happened to the kernel during the execution of the application-code components 52. A "trace" is the observance of potentially any type of "event" in the kernel that reflects the type of processing requiring profiling by the system 20. Information about an event can be stored in the kernel instrumentations buffer 96, which can be an object, an array, or some other data structure. The kernel instrumentations buffer 96 can also receive profiling information from a plurality of kernel instrumentations points 94. Kernel instrumentation points 94 are various "points" or address locations in the kernel where raw data is captured by the system 20 for ultimate use in generating runtime metrics. Kernel instrumentation points 94 include virtually any machine code instruction in the kernel. Events can occur at a particular kernel instrumentation point 94. Examples of such events include but are not limited to scheduler events, scheduler lock, scheduler unlock, rescheduling, thread operations, interrupts, time slicing, mutux operations, binary semaphore operations, counting semaphore operations, clock ticks and interrupts, and other types and categories of events.

The kernel instrumentations buffer 96 incorporates the information relating to the virtual machine 62 obtained through the kernel instrumentation user trace 92 and the kernel instrumentation points 94. The buffer 96 combines all of the information into the format of kernel instrumentation data 98 which can then exported to the profiler 45 for parsing, formatting, correlation, and analysis so that runtime metrics can be organized and displayed in efficient and usable ways. Kernel instrumentation data 98 can be sent to the profiler 45 in the form of a kernel instrumentation data record.

Figure 11:
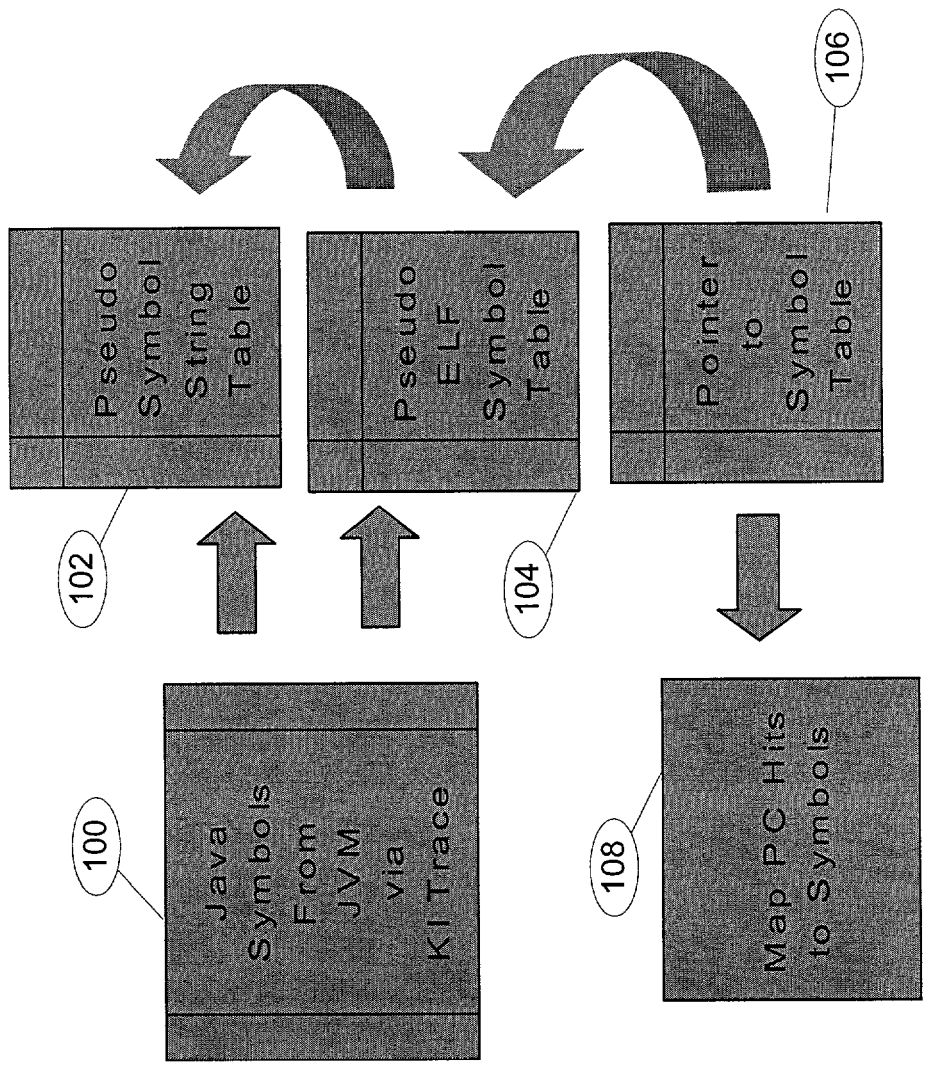
FIG. 11 is a process-flow diagram illustrating an example of how various pointers and tables can be used to generate runtime metrics.

FIG. 11 is a diagram illustrating how some raw information is processed by aspects of the kernel profiling subsystem in some of the Java embodiments of the kernel profiling subsystem. Java symbols are obtained at 100 from the Java virtual machine 62 via the kernel instrumentations user trace 92. This process is described in greater detail above. The Java symbols represent raw unformatted information that can be used to generate runtime metrics by the system 20. The Java symbols at 100 are sent to the pseudo symbol string table at 102 and the pseudo ELF symbol table at 104. The pseudo symbol string table at 102 is used to connect raw Java symbols from step 100 into more user accessible string messages located on the pseudo symbol string table at 102. The pseudo ELF symbol table at 104 contains the information needed to correctly identify the Java code functional units. The raw information generated by the kernel profiling subsystem becomes mere text after it is captured. The pseudo ELF symbol table at 104 can be used to distinguish between various data types, objects, functions, etc. Thus, an arrow from the pseudo ELF symbol table at 104 leads to the pseudo symbol string table at 102, because the "string messages" stored at 102 will need to incorporate the intelligence relating to what various symbols mean.

At 106 is a pointer to the symbol table. Of all of the processing in FIG. 10, the step at 106 occurs closest to the occurrence of a kernel "event" as described above. The pointer to the symbol table at 106 is used to map actual hits to the symbols at 108. Such "hit" information becomes part of the runtime metric, as described above. The pointer at 106 is also sent to the symbol table at 104, to begin the process that ends with a user-accessible formatted text message at 102. The pointer at 106 is not a global pointer in the sense that its function is limited to linking Java symbols with substantive runtime metric information relating to those symbols.

Examples of two global pointers that can be used by the system 20 in a Java embodiment are a Slot **methodmap_table, a pointer to the Java method map hash table (or alternatively array), and a JVMData *methodmap_data, a pointer to the collected unwound data in the Java virtual machine stack. The system 20 can incorporate a wide variety of different techniques for utilizing pointers and tables to generate runtime metrics. The diagram in FIG. 11 refers to some of the tables as "pseudo" tables because these tables are created by the profiler 45 from the data passed to it from the virtual machine 62 and masquerade as real ELF symbols and ELF string tables that the profiler 45 could load from an ELF disk file.

FIG. 12 is an example of a code listing in a Java embodiment of the system 20. A messaging protocol is disclosed in the Figure, although a wide variety of different messaging protocols can be incorporated into the system 20. The disclosed messaging protocol is used to communicate compilation and de-compilation information the system 20 to facilitate the generation of compilation metrics. As disclosed in FIG. 12, a binary blob can be used to store certain fields (e.g. <bit-field><bit-field><addr1><addr2>) in a preferred embodiment of the system 20.

VII. Non-Java and Other Alternative Embodiments

Many of the code examples and illustrations used above relate in some way to the Java programming language. However, use of the system 20 is not limited to Java, platform-independent programming languages, or even object-oriented programming languages. The use and functionality of a method map can be supported by a wide variety of different categories of programming languages. Other programming languages can support data structures or objects resembling the method map table 72 described above. Similarly, the functionality of the kernel profiling subsystem can also be supported by a wide variety of different programming languages and platforms. Differences between the programming language of the software application 52 and the underlying native code library 64 may make use the system 20 especially advantageous in profiling runtime environments utilizing virtual machines 62, but even virtual machine 62 embodiments are not limited to the Java programming language. Virtual machines 62 can be used to facilitate platform-independence in non-Java languages. For example, a virtual machine could be created to support programming languages including but not limited to C++, Curl, COBOL, C, BASIC, JavaScript, Visual Basic, FORTRAN, and others. Moreover, a Java virtual machine 62 could be modified to facilitate use by non-lava language The system 20 described above is not limited to any particular technology, programming language, or other environmental limitation and should be viewed as expansively as possible. For example, future programming languages and architectures may be developed in the future that will be superior to Java and other currently existing languages. The system 20 can be utilized in such future environments, as well as other currently existing embodiments.

It should be understood that various alternatives to the embodiments of the invention described herein may be employed in practicing the invention. It is intended that the following claims define the scope of the invention and that the method and apparatus within the scope of these claims and their equivalents be covered thereby. It is anticipated and intended that future developments will occur in programming languages and information technology systems, and that the invention will be incorporated into such future embodiments.

What is claimed is:

1. A profiling system for runtime environments, comprising:
   a software application written in a platform-independent programming language;
   a non-application-code component invoked by said software application; and
   a profiling tool for generating a runtime metric, said runtime metric including an application metric and a non-application-code metric, said profiling tool generating said application metric from said software application and said non-application-code metric from said non-application-code component.

2. The system of claim 1, wherein said platform-independent programming language is Java.

3. The system of claim 1, wherein said software application is written in a different programming language than said non-application-code component.

4. The system of claim 1, further comprising a virtual machine for interfacing said software application with said non-application-code component, said runtime metric Farther including a virtual machine metric, and said profiling tool generating said virtual machine metric from said virtual machine.

5. The system of claim 4, further comprising a kernel for running said virtual machine, said runtime metric further including a kernel metric, and said profiling tool generating said kernel metric from said kernel.

6. The system of claim 1, said runtime metric further comprising a time-stamped compilation log.

7. The system of claim 6, said runtime metric further comprising a kernel metric.

8. The system of claim 1, said software application including a dynamically re-compiled Java method, and said profiling tool generating a metric from said application metric.

9. The system of claim 1, said profiling tool does not include an embedded agent.

10. The system of claim 1, wherein said application software is not specially prepared for said profiling tool.

11. The system of claim 1, wherein said profiling tool does not modify a flow of control in said software application.

12. The system of claim 1, including an invocation interface, wherein said invocation interface invokes said software application without a profiling decision by said invocation interface.

13. The system of claim 1, further comprising an invocation interface, wherein said profiling tool is launched remotely by said invocation interface.

14. The system of claim 13, wherein a firewall separates said invocation interface from said software application.

15. The system of claim 1, further comprising a method map, wherein said profiling tool generates said runtime metric with said method map.

16. The system of claim 1, wherein said non-application-code component comprises a virtual machine, said system further comprising:
   a kernel profiling subsystem, including a trace and a data record;
   wherein said virtual machine sends said trace to said kernel profiling subsystem, said kernel profiling subsystem generates said data record from said trace, and said kernel profiling subsystem sends said data record to said profiling tool.

17. The system of claim 16, said kernel profiling subsystem further including:
a plurality of kernel instrumentation points; and
a kernel instrumentation trace buffer;
wherein said kernel instrumentation trace buffer generates said data record from said kernel instrumentation points.

18. The system of claim 17, further comprising a client computer running said software application, wherein said kernel profiling subsystem does not occupy a port on a client computer.

19. The system of claim 17, wherein said kernel profiling subsystem updates a compiled method data record in a dynamic manner.

20. The system of claim 1, further comprising a method map, said application metric generated from said method map with said profiling tool.

21. The system of claim 1, wherein said application metric and said non-application-code metric are created during the same execution of said software application.

22. A system for profiling a runtime environment of a Java application, comprising:
a Java-code profiling subsystem for generating a Java-code metric based on execution of a Java-code application that is executed on a virtual machine;
an external instrumentation profiling subsystem for generating an external metric based on an external instrumentation darn record;
a virtual machine profiling subsystem for generating a virtual machine metric based on operation of said virtual machine.

23. The system of claim 22, said system for profiling including a method map and a header table, said system for profiling generating a runtime metric from said method map and said header table.

24. The system of claim 23, said system for profiling including:
a symbol table, comprising a symbol data row;
a symbol string table, comprising a string data row linking a string to said symbol data row; and
a pointer, said pointer identifying said symbol data row;
wherein said profiling tool maps bits to symbols with said pointer.

25. A method for profiling the runtime environment of an application-code component, comprising:
executing the application-code component in a runtime environment that includes a non-application code component;
running a profiler with respect to the executing application-code component;
generating an application-code metric from the application-code component with the profiler; and
creating a non-application-code metric from the non-application-code component with the profiler;
wherein the application-code metric and the non-application-code metric are generated from one execution of the application-code component in a runtime environment.

26. The method of claim 25, wherein only a profiling tool is applied to the runtime environment during the running of the profiler.

27. The method of claim 25, said generating an application-code metric including:
tracking a dynamic re-compilation of a method in the application-coda component; and
breaking down a method profile into a per-compilation-metric.

28. The method of claim 25, wherein running the profiler does not require an embedded agent.

29. The method of claim 25, wherein running the profiler does not require any special preparation of the application-code component.

30. The method of claim 25, wherein running the profiler does not modify a flow of control in the application-code component during runtime.

31. The method of claim 25, said running the profiler including:
launching the profiler through an invocation interface; and
invoking the execution of the application code component trough the invocation interface;
wherein said launching occurs after said invoking.

32. The method of claim 31, wherein the profiler is launched from a client computer at a remote location.

33. The method of claim 32, wherein an Internet firewall exists between the profiler and the application-code component.

34. A profiling tool stored on a medium for storing computer-readable instructions, said profiling tool, when executed, generating a runtime metric, said runtime metric including an application metric and a non-application-code metric, said profiling tool generating said application metric from a software application and said non-application-code metric from a non-application-code component used by said software application.

35. The tool of claim 34, wherein said software application is in a platform-independent programming language.

36. The tool of claim 35, wherein said programming language is Java.

37. The tool of claim 34, wherein said software application is written in a different programming language than said non-application-code component.

38. The tool of claim 34, further comprising a virtual machine for interfacing said software application with said non-application-code component, said runtime metric further including a virtual machine metric, and said profiling tool generating said virtual machine metric from said virtual machine.

39. The tool of claim 38, further comprising a kernel for running said virtual machine, said runtime metric further including a kernel metric, and said profiling tool generating said kernel metric from said kernel.

40. The tool of claim 34, said profiling tool does not use an agent embedded in said software application.

41. The tool of claim 34, wherein said application software is not specially prepared for said profiling tool.

42. The tool of claim 34, wherein said profiling tool does not modify a flow of control in said software application.

43. The tool of claim 34, further comprising a method map, wherein said profiling tool generates said runtime metric with said method map.

44. The tool of claim 34, further comprising:
a kernel profiling subsystem, including a trace and a data record;
wherein a virtual machine sends said trace to said kernel profiling subsystem, said kernel profiling subsystem generates said data record from said trace, and said kernel profiling subsystem sends said data record to said profiling tool.

45. The tool of claim 44, said kernel profiling subsystem further including:
a plurality of kernel instrumentation points; and
a kernel instrumentation trace buffer;

wherein said kernel instrumentation trace buffer generates said data record from said kernel instrumentation points.

46. The tool of claim 45, further comprising a client computer running said software application, wherein said kernel profiling subsystem does not occupy a port on a client computer.

47. The tool of claim 45, wherein said kernel profiling subsystem updates a compiled method data record in a dynamic manner.

48. The tool of claim 34, wherein said application metric and said non-application-code metric are created during the same execution of said software application.

49. A system for profiling the runtime environment of an application-code component, comprising:
   means for executing the application-code component in a runtime environment tat includes a non-application code component;
   means for generating an application-code metric from operation of the application-code component; and
   means for determining a non-application-code metric from operation of the non-application-code component;
   wherein the application-code metric and the non-application-code metric are generated from one execution of the application-code component in a runtime environment.

50. The system of claim 49, wherein said means for generating an application-code metric comprise:
   means for tracking a dynamic re-compilation of a method in the application-code component; and
   means for breaking down a method profile into a per-compilation-metric.

51. The system of claim 49, wherein said means for generating do not comprise an embedded agent.

52. The system of claim 49, wherein said means for generating do not modify a flow of control in the application-code component during runtime.

53. A profiling system for runtime environments, comprising:
   a software application written in a platform-independent programming language;
   a virtual machine supporting said software application; and
   a profiling tool for generating a runtime metric, said runtime metric including an application metric and a virtual machine metric, said profiling tool generating said application metric from said software application and said virtual machine metric from said virtual machine.

* * * * *

UNITED STATES PATENT AND TRADEMARK OFFICE
CERTIFICATE OF CORRECTION

PATENT NO. : 7,266,810 B2
APPLICATION NO. : 10/120036
DATED : September 4, 2007
INVENTOR(S) : Ashish Karkare et al.

It is certified that error appears in the above-identified patent and that said Letters Patent is hereby corrected as shown below:

On the face page, in field (73), in "Assignee", in column 1, line 2, delete "LP.," and insert -- L.P., --, therefor.

In column 11, line 3, after "tool" insert -- 44 --.

In column 14, line 16, delete "non-lava" and insert -- non-Java --, therefor.

In column 14, line 23, after "embodiments" insert -- that --.

In column 14, lines 25-45, delete "In a Java runtime embodiment, a runtime compiler creates platform specific versions of instructions (e.g. compiled code 72) that are executed by the application. The runtime compiler can be instructed to generate platform specific versions of all instructions, or can be limited to generate platform specific versions of only a few selection instructions. A method map table can be instantiated to act as a repository of information about instructions that currently have platform specific versions. The method map table can capture such information as the application server 24 on an instruction-by-instruction basis as the runtime compiler processes these routines to generate platform specific versions. In non-lava embodiments, other objects, data structures, and/or files can be used to fulfill the same functionality. The memory used to hold the platform specific versions of the routines can be logically partitioned into various subspaces 74, with each subspace holding a finite collection of the routines. The size of such sub spaces can be determined through consideration of the various tradeoffs, and alternative embodiments that may utilize subspaces that vary widely in storage capacities."
and insert -- The method map 70 can have a hash table data structure to minimize the time and resource consumed for adding entries, deleting entries, and searching entries on the table 70. The method map 70 can have virtually as many slots as are needed, up to N slots, where N can represent the number of application code instructions invoked in the runtime environment during the profiling of the software application 52. Each slot on the method map should preferably correspond to a memory subspace 74. The component runtime metrics correlators are loaded into the method map 70. The first_instruction of each entry is the hash table key. Each slot can hold the method map entries whose first_instruction is in the corresponding memory subspace 74. Each slot chain can be ordered by the first_instruction for the particular entry. The types of links data formats used by the method map can vary widely in a wide variety of different embodiments. --, therefor.

In column 17, line 52, delete "non-lava" and insert -- non-Java --, therefor.

UNITED STATES PATENT AND TRADEMARK OFFICE
CERTIFICATE OF CORRECTION

PATENT NO. : 7,266,810 B2
APPLICATION NO. : 10/120036
DATED : September 4, 2007
INVENTOR(S) : Ashish Karkare et al.

It is certified that error appears in the above-identified patent and that said Letters Patent is hereby corrected as shown below:

In column 18, lines 24-25, in Claim 4, delete "Farther" and insert -- further --, therefor.

In column 19, line 28, in Claim 22, delete "darn" and insert -- data --, therefor.

In column 19, line 42, in Claim 24, delete "bits" and insert -- hits --, therefor.

In column 19, line 65, in Claim 27, delete "application-coda" and insert -- application-code --, therefor.

In column 20, line 12, in Claim 31, delete "application code" and insert -- application-code --, therefor.

In column 20, line 13, in Claim 31, delete "trough" and insert -- through --, therefor.

In column 21, line 17, in Claim 49, delete "tat" and insert -- that --, therefor.

Signed and Sealed this

Fifteenth Day of September, 2009

David J. Kappos
*Director of the United States Patent and Trademark Office*